(12) United States Patent
Altammar

(10) Patent No.: US 12,107,521 B1
(45) Date of Patent: Oct. 1, 2024

(54) PIEZOELECTRIC POWER GENERATOR FOR WIND ENERGY HARVESTING

(71) Applicant: KING FAISAL UNIVERSITY, Al-Ahsa (SA)

(72) Inventor: Hussain Altammar, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/441,535

(22) Filed: Feb. 14, 2024

(51) Int. Cl.
*H02N 2/18* (2006.01)
*H02N 2/00* (2006.01)

(52) U.S. Cl.
CPC ........... *H02N 2/186* (2013.01); *H02N 2/0055* (2013.01); *H02N 2/181* (2013.01)

(58) Field of Classification Search
CPC .......... H02N 2/18; H02N 2/181; H02N 2/183; H02N 2/185; H02N 2/186; H02N 2/188; H10N 30/30; H10N 30/302; H10N 30/304; H10N 30/306; H10N 30/308
USPC ....................................................... 310/339
See application file for complete search history.

(56) References Cited

U.S. PATENT DOCUMENTS

| | | | |
|---|---|---|---|
| 6,860,218 B2 | 3/2005 | Eagles | |
| 8,884,496 B2 | 11/2014 | Lipson | |
| 11,401,911 B2 | 8/2022 | Kovacs | |
| 2010/0164231 A1* | 7/2010 | Tsou | H02N 2/185 290/55 |
| 2012/0228992 A1 | 9/2012 | Skotnicki | |
| 2014/0112779 A1 | 4/2014 | Gharib | |
| 2014/0312742 A1* | 10/2014 | Balasingam | H02N 2/185 29/25.35 |
| 2017/0163178 A1 | 6/2017 | Dabby et al. | |
| 2019/0393805 A1 | 12/2019 | Arnett et al. | |

FOREIGN PATENT DOCUMENTS

| | | |
|---|---|---|
| EP | 2171707 A1 | 4/2010 |
| WO | 2016202348 A1 | 12/2016 |
| WO | 2018215890 A1 | 11/2018 |

* cited by examiner

*Primary Examiner* — Derek J Rosenau
(74) *Attorney, Agent, or Firm* — Nath, Goldberg & Meyer; Joshua B. Goldberg

(57) ABSTRACT

A piezoelectric power generator includes a stiff segment having a plurality of piezoelectric elements. A flexible segment extends from the stiff segment, and a shape memory element is incorporated into the flexible segment to control its stiffness. A network of capillary-like tubes are also integrated into the flexible segment to control its density (mass). The proposed design optimizes the performance of the piezoelectric wind energy generator under high-speed conditions by controlling mass and stiffness of the flexible segment.

12 Claims, 3 Drawing Sheets

PIEZOELECTRIC POWER GENERATOR FOR WIND ENERGY HARVESTING

BACKGROUND

1. Field

The present disclosure relates to systems that generate energy from the wind, and particularly to a piezoelectric power generator for wind energy harvesting.

2. Description of the Related Art

Generating energy from natural resources comes in many forms. There are dams that use water to generate energy and wind turbines that generate energy from the wind. Wind turbines are found in the mountains and offshore where wind is the most plentiful and powerful. Piezoelectric flags are also used to generate energy from wind power and are drawing increasing attention in the world of energy harvesting.

SUMMARY

An improved piezoelectric wind energy generator includes a shape memory alloy incorporated into a flexible fabric segment. Adjustment of the flexible fabric segment in terms of stiffness and length can be made using the shape memory alloys. In order to trigger the shape memory alloy, voltage is required and supplied from the piezoelectric elements. These enhancements maximize the output power of the generator, particularly in situations with varying high-speed conditions, while simultaneously preventing the twirling phenomenon that typically occurs in the flexible segment during high wind speeds.

A piezoelectric power generator, in one embodiment, includes a stiff segment having a plurality of piezoelectric elements. A flexible segment extends from the stiff segment, and a shape memory element is incorporated into the flexible segment.

The plurality of piezoelectric elements is located on the stiff segmentor or is embedded in the stiff segment. In alternate embodiments, the piezoelectric elements are located on and embedded in the stiff segment.

The shape memory element can be a shape memory alloy. In other embodiments, a tank is connected to horizontal vessels which are connected to a tank. Additionally, capillary tubes can extend from the horizontal vessel.

A piezoelectric power generating method includes: converting movement of a flexible segment extending from a stiff segment having a plurality of piezoelectric elements through the plurality of piezoelectric elements; and controlling the shape of the flexible segment through a shape memory element incorporated into the flexible segment and connected to at least one of the plurality of piezoelectric elements.

The plurality of piezoelectric elements is located on the stiff segment or is embedded in the stiff segment. In alternate embodiments, the piezoelectric elements are located on and are embedded in the stiff segment.

In other embodiments, it is a horizontal vessel connected to a tank. The tank supplies a substance, such as water, to the horizontal vessel to control the density of the flexible segment. Additionally, capillary tubes can extend from the horizontal vessel.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
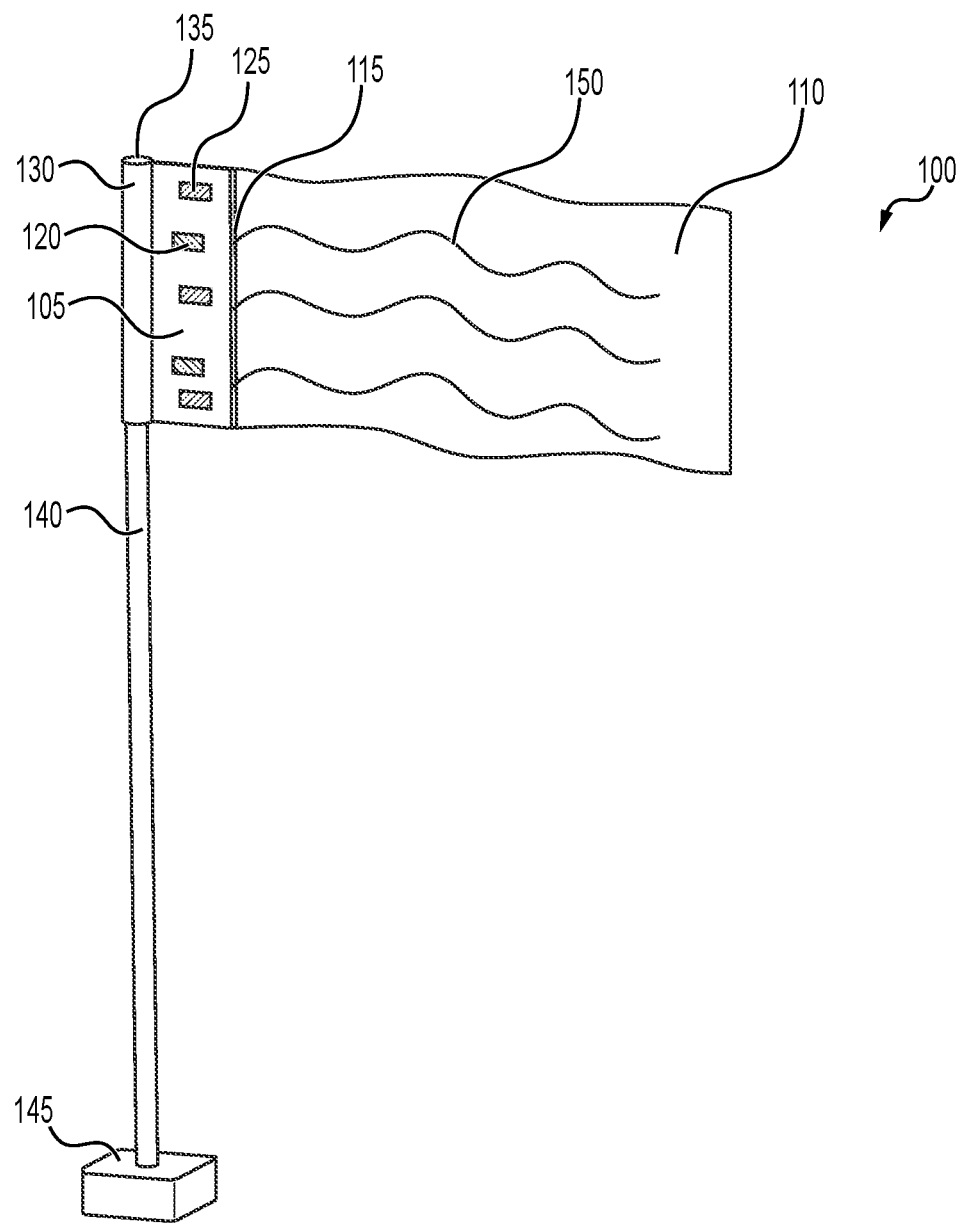
FIG. 1 is an illustration of a flag shaped piezoelectric power generator for wind energy harvesting.

FIG. 1 is an illustration of a flag shaped piezoelectric power generator for wind energy harvesting. The flag shaped piezoelectric wind energy generator 100 include a stiff segment 105 and a flexible segment 110. The two segments are connected together through a fixed joint 115 such that the vibrational energy from the flexible segment 110 is transmitted to the stiff segment 105 in the form of mechanical vibrations. The vibrations generated by the flexible segment 110 produce flexural deformation making longitudinal piezoelectric elements 120 mounted on the surface and shear-mode piezoelectric elements 125 embedded inside the stiff segment 105 a suitable selection to convert the mechanical energy into electrical energy. The stiff segment 105 is also connected to a shaft 130 with bearings 135 at both ends making the design adaptable to wind direction. The shaft 130 is connected to a pole 140 having a base 145.

Shape memory alloys 150 are incorporated into the flexible segment 110. This flexible segment 110, also known as the 'fabric', can be adjusted in terms of stiffness and length using the shape memory alloys 150. In order to trigger the shape memory alloys 150, voltage is supplied from the piezoelectric elements 120,125 that are attached to or embedded in the stiff segment 105. These enhancements maximize the output power of the generator, particularly in situations with varying high-speed conditions, while simultaneously preventing a twirling phenomenon that typically occurs in the flexible segment 110 during high wind speeds. When the flexible segment 110 of the wind energy generator is exposed to high wind speeds, it can lead to a decrease in generated power and potential damage due to twirling. To address this issue, the shape memory alloys 105 are triggered to allow the alloys to regain their original shape (A2) (as illustrated in FIG. 2) by supplying heat to the alloys through voltage.

Figure 2:
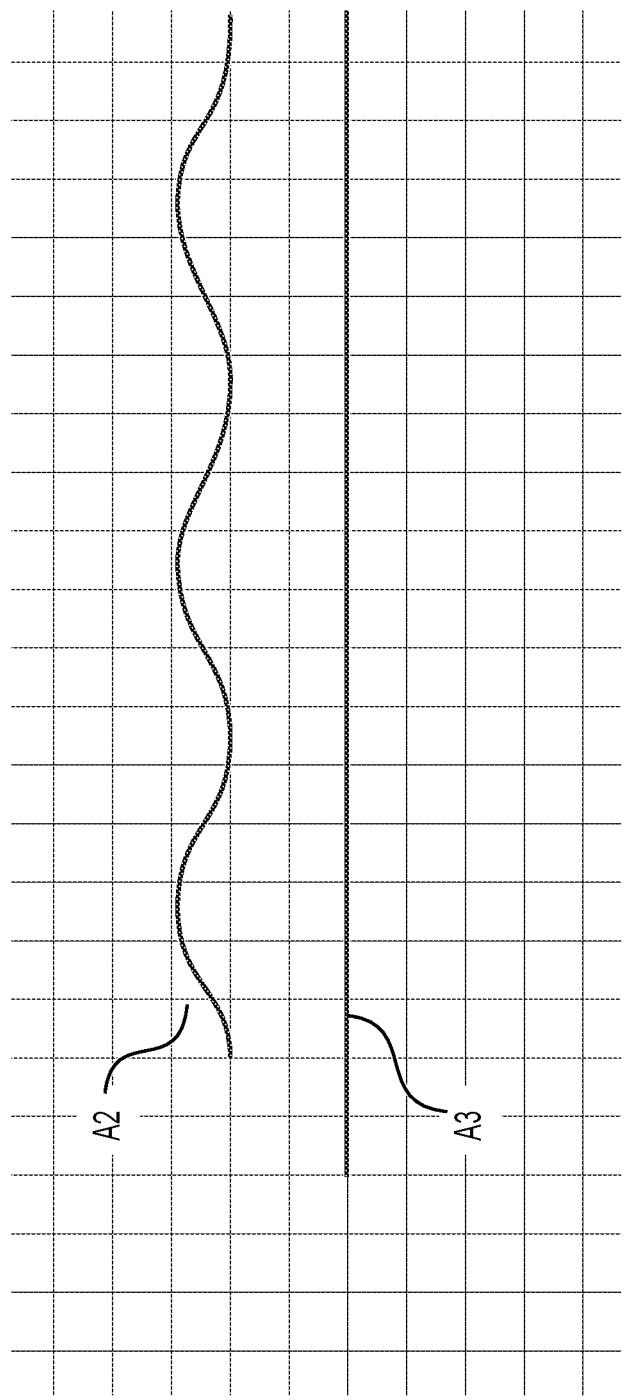
FIG. 2 illustrates the geometry of the shape memory alloys.

FIG. 2 illustrates the geometry of the shape memory alloys 105. A2 is the original shape, whereas A3 is the deformed shape. When heat is supplied to the alloys through voltage from piezoelectric elements 120,125, the shape memory alloys 105 return to their original shape A2. This restoration causes the length of the flag to shorten, resulting in a lower frequency and reduced surface area. Consequently, this leads to a decrease in the wind energy captured by the flexible segment 110, preventing damage to the flexible segment 110.

Figure 3:
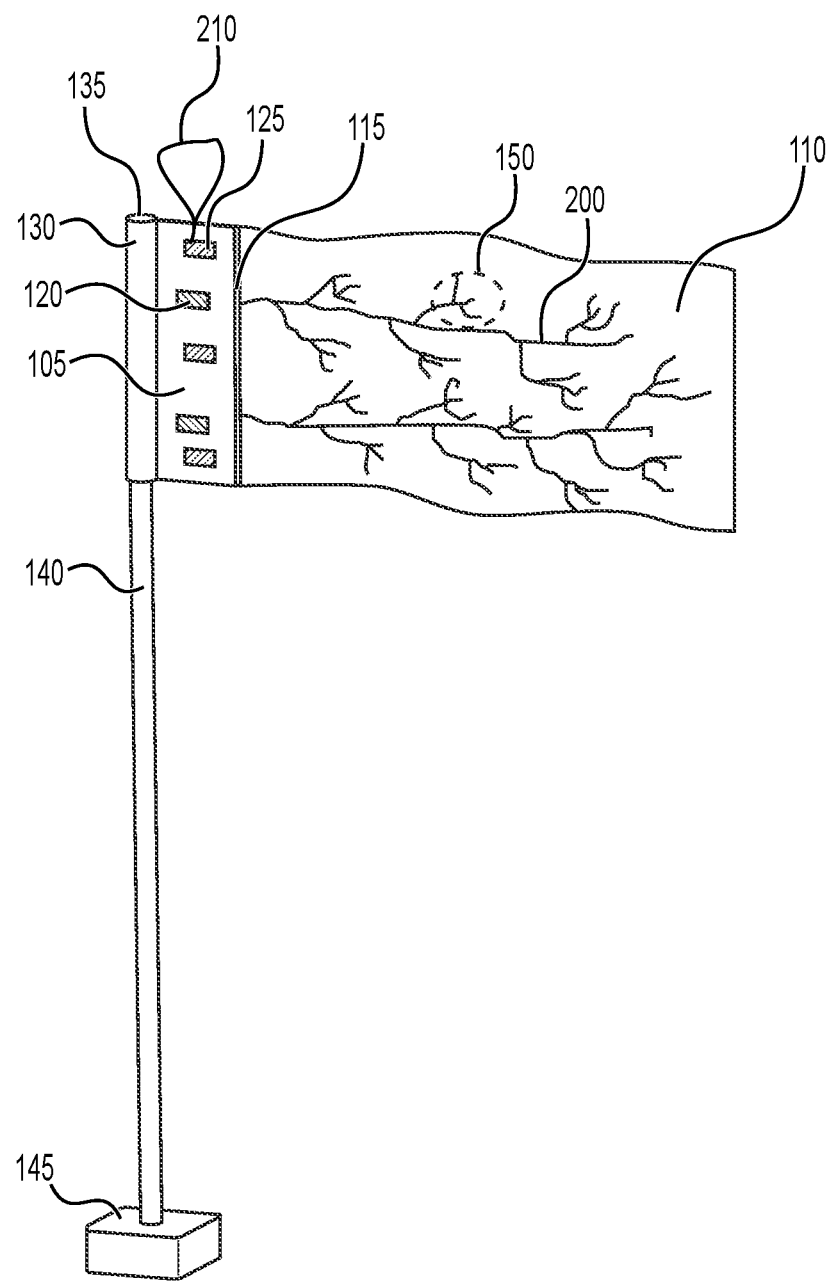
FIG. 3 is an illustration of an alternate embodiment of the flag shaped piezoelectric power generator for wind energy harvesting.

FIG. 3 is an illustration of another embodiment of the flag shaped piezoelectric power generator for wind energy harvesting. In this embodiment, all elements remain the same except for the shape memory alloys 150. A network of horizontal vessels 200 and small capillary-like tubes 205, and a tank 210 holding a substance such a water are used instead of the shape memory alloys 150. These additions serve to optimize the output power under varying wind gusts and high-speed conditions. The flexible segment 110, referred to as the 'fabric', can have its density adjusted by supplying a substance (water) through horizontal vessels 200. The amount of water flow is proportional to the intensity of the wind force, pushing it in the direction of the wind. Additionally, small capillary-like tubes 205, positioned to lean towards the wind direction, utilize capillary effects to facilitate liquid flow. This unique design eliminates the need for a pump while providing mechanical adjustment of the fabric's density. When the fabric's density increases, it translates into higher forces transmitted to the stiff segment, resulting in increased power generation through the piezoelectric elements 120,125.

In a particular embodiment, the shape-memory alloys (150) and the network of vessels (200) are intertwined. Triggering shape-memory alloys is expected to shrink the vessels, resulting in less water flow. Thus, the shape-memory alloys can also indirectly control the density of the flexible segment.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A piezoelectric power generator, comprising:
a stiff segment having a plurality of piezoelectric elements;
a flexible segment extending from the stiff segment; and
a shape memory element incorporated into the flexible segment,
wherein the shape memory element is a shape memory alloy.

2. The piezoelectric power generator as recited in claim 1, wherein the plurality of piezoelectric elements are located on the stiff segment.

3. The piezoelectric power generator as recited in claim 1, wherein the plurality of piezoelectric elements are embedded in the stiff segment.

4. The piezoelectric power generator as recited in claim 1, wherein the plurality of piezoelectric elements include piezoelectric elements located on the stiff segment and piezoelectric elements embedded in the stiff segment.

5. The piezoelectric power generator as recited in claim 1, further comprising a tank connected to horizontal vessels.

6. The piezoelectric power generator as recited in claim 5, further comprising capillary tubes extending from the horizontal vessel.

7. A piezoelectric power generating method, comprising:
converting movement of a flexible segment extending from a stiff segment having a plurality of piezoelectric elements through the plurality of piezoelectric elements; and
controlling the shape of the flexible segment through a shape memory element incorporated into the flexible segment and connected to at least one of the plurality of piezoelectric elements,
wherein the shape memory element is a shape memory alloy.

8. The method as recited in claim 7, wherein the plurality of piezoelectric elements are located on the stiff segment.

9. The method as recited in claim 7, wherein the plurality of piezoelectric elements are embedded in the stiff segment.

10. The method as recited in claim 7, wherein the plurality of piezoelectric elements include piezoelectric elements located on the stiff segment and piezoelectric elements embedded in the stiff segment.

11. The method as recited in claim 7, wherein the shape memory element is a horizontal vessel connected to a tank, the tank supplying a substance to the horizontal vessel to control the density of the flexible segment.

12. The method as recited in claim 7, wherein the shape of the flexible segment is further controlled by capillary tubes extending from the horizontal vessel.

* * * * *